Aug. 4, 1959 J. I. ANTONIUS 2,898,170
COLLAPSIBLE AUTOMOBILE TABLES
Filed Sept. 18, 1958
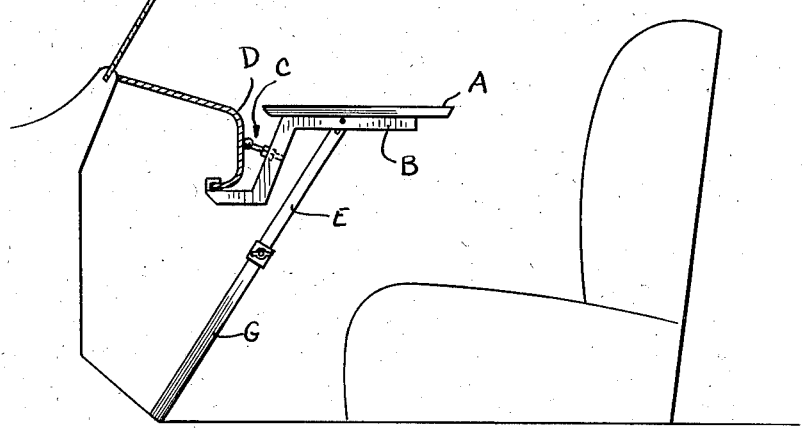
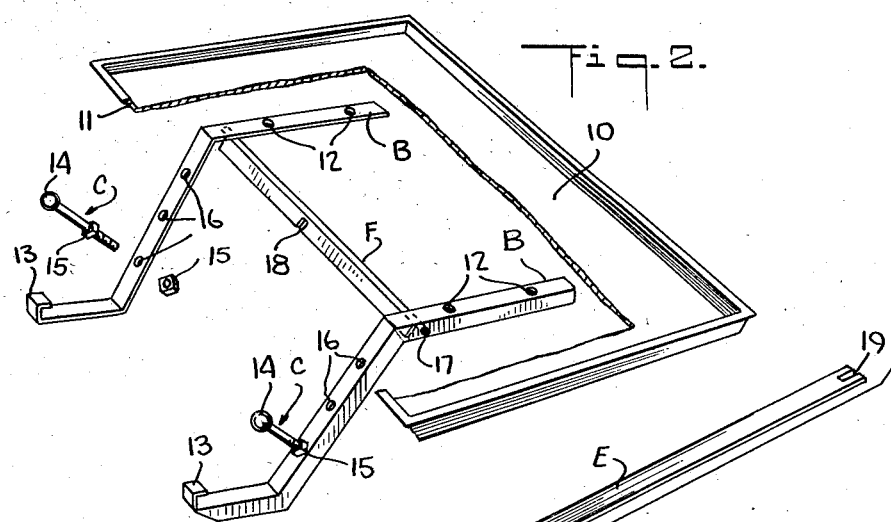
INVENTOR.
JOHN I. ANTONIUS United States Patent Office 2,898,170
Patented Aug. 4, 1959

2,898,170

COLLAPSIBLE AUTOMOBILE TABLES

John I. Antonius, Palisades Park, N.J.

Application September 18, 1958, Serial No. 761,894

1 Claim. (Cl. 311—21)

My invention relates to collapsible tables, and refers specifically to a collapsible table adapted to be attached to the instrument panel of an automobile or truck.

It is often desirable to have a table in an automobile, for example, while eating lunch in the car when hunting, skiing, attending a drive-in theatre or restaurant, or when traveling in a vehicle, especially with children. For the purposes of manufacture of such a table, it should be so designed that it can be attached to vehicles of many different makes and designs.

An object of my invention, therefore, is to provide a table which is adapted to be attached to the instrument panel of a variety of makes and models of automobiles and trucks.

Another object of my invention is to provide a device of the above description which is strong, economical to produce, and remarkably stable when in use.

With the above and related objects in view, my invention consists of the details of construction and combination of parts as described in the following paragraphs, and illustrated in the accompanying diagrams, wherein:

Figure 1 is a fragmentary sectional elevation view showing the table attached to the instrument panel of an automobile.

Figure 2 is a fragmentary exploded view of the table showing the tray and its supporting elements.

Figure 3 is a partly oblique view showing the components of the supporting leg.

Referring now to the diagrams, wherein similar reference characters designate similar parts, I show a table adapted to be attached to the instrument panel of an automobile, the tray being generally designated as A. The tray A consists of a unitary sheet 10 preferably made of laminated wood, plastic or metal. The sheet 10 is substantially rectangular and is fitted with raised marginal rims II. The tray is supported by two beams, each herein generally designated as B, each of said beams being a mirror image of the other beam. Each beam is substantially L shaped in cross section. Each beam B is attached to the tray A by small bolts which pass through perforations 12 in the beams, and through perforations in the tray, which are not shown. One end of each beam is bent to form a hook 13, said hook being U shaped in cross section and designed to attach to the free edge of the instrument panel D. A partly vertical segment of the beams contains a plurality of aligned perforations 16, designed to retain threaded bolts which are generally designated C. The bolts C are threaded on one end, and are covered on the other end by rubber suction cups or by firm rubber knobs 14, said cups or knobs being designed to press against the instrument panel stabilizing the table when in use. Each bolt C is provided with two retaining nuts 15, one of said retaining nuts being located on one side of the supporting beam B, and the other retaining nut being located on the opposite side of the supporting beam B. Turning the retaining nuts in such a way that they approximate each other locks the bolts C in a predetermined position. Each bolt C is designed to be adjustable in length by altering the setting of its retaining nuts 15. Said bolts may be adapted to a variety of instrument panels by changing them from one of said aligned perforations to another.

A supporting bar is generally designated F. It is substantially rectangular in shape, and is provided with a pivot 17 at each end, each of said pivots being adapted to pass through a perforation in one of said supporting beams. A recess 18 is provided in the middle of one edge of said supporting bar, said recess being substantially rectangular in shape and designed to receive one end of a leg member, said leg member being generally designated E. The leg member E is substantially rectangular in shape and is provided with a recess 19 in one end, said recess being designed to receive that portion of the supporting bar which is opposite the recess 18.

A second leg member is generally designated G. It is substantially rectangular in shape, and is provided at one end with a box structure 22, said box structure providing a channel 20, said channel being designed to receive the nonrecessed end of the leg member E. A set screw 21 fits in a threaded perforation in the box structure 22, and is designed to lock the leg member E in a predetermined position. The naked end of the leg member G is designed to rest on the floor boards of a vehicle.

To use the table, the hooks 13 are attached to the instrument panel of an automobile. The tray is positioned such that the side farthest away from the hooks is one-half inch below a horizontal position. The bolts C are adjusted such that with the tray in this position, the rubber knobs or cups are in contact with the instrument panel. The leg member G is attached to the leg member E. The leg member E is then attached to the supporting bar F such that the recess of leg member E interlocks with the recess of the supporting bar. Slight upward pressure on the leg member E brings the tray in a horizontal position. The set screw 21 is tightened, and the table is locked in position.

Since the foregoing description is illustrative rather than limiting, the scope of my invention is to be determined as claimed.

I claim as my invention:

An automobile table composed of a tray, a pair of supporting beams upon which said tray is mounted, said supporting beams being provided with a hook on one end, said hook being substantially U shaped in cross section and designed to attach to the instrument panel of an automobile, a plurality of threaded bolts covered on one end by rubber knobs or suction cups, said bolts being designed to be interchangeably installed in a plurality of aligned perforations in said supporting beams, a plurality of threaded nuts designed to retain said bolts in a predetermined position, a horizontal supporting bar provided with a pivot on each end, said pivots being designed to be installed in a pair of aligned perforations in said supporting beams, a leg member provided with a recess in one end, said recess being designed to coact with a similar recess in the mid-portion of said supporting bar providing a mechanism whereby said leg member may be detachably mounted on said supporting bar, a leg member provided with a box structure designed to slidably enclose previously said leg member, said box structure being provided with a set screw by means of which said leg members may be locked in a predetermined position.

References Cited in the file of this patent
UNITED STATES PATENTS

| | | |
|---|---|---|
| 1,896,971 | Ravlin | Feb. 7, 1933 |
| 1,899,480 | Ravlin | Feb. 28, 1933 |
| 2,721,777 | Willis | Oct. 25, 1955 |
| 2,746,767 | Evans | May 22, 1956 |
| 2,771,331 | Messman | Nov. 20, 1956 |
| 2,791,476 | Atwill | May 7, 1957 |
| 2,792,267 | Hubbard | May 14, 1957 |